US012151757B2

(12) United States Patent
Ahnert et al.

(10) Patent No.: US 12,151,757 B2
(45) Date of Patent: Nov. 26, 2024

(54) SUSPENSION SEATPOST WITH INTERNAL SPRING

(71) Applicant: Redshift Sports, LLC, Philadelphia, PA (US)

(72) Inventors: Stephen Dewei Ahnert, San Bruno, CA (US); Erik Teig de Brun, San Francisco, CA (US); Scott David Poff, Philadelphia, PA (US)

(73) Assignee: Redshift Sports, LLC

( * ) Notice: Subject to any disclaimer, the term of this patent is extended or adjusted under 35 U.S.C. 154(b) by 1062 days.

(21) Appl. No.: 16/374,598

(22) Filed: Apr. 3, 2019

(65) Prior Publication Data

US 2019/0300084 A1 Oct. 3, 2019

Related U.S. Application Data

(60) Provisional application No. 62/652,008, filed on Apr. 3, 2018.

(51) Int. Cl.
*B62J 1/06* (2006.01)
*F16F 15/067* (2006.01)

(52) U.S. Cl.
CPC .............. *B62J 1/06* (2013.01); *F16F 15/067* (2013.01); *F16F 2228/066* (2013.01); *F16F 2228/08* (2013.01); *F16F 2232/08* (2013.01); *F16F 2238/026* (2013.01)

(58) Field of Classification Search
CPC ................................ B62J 1/06; F16F 2232/08
See application file for complete search history.

(56) References Cited

U.S. PATENT DOCUMENTS

| 602,389 | A | * | 4/1898 | Whitlow | F16F 15/067 |
| | | | | | 297/209 |
| 2,467,676 | A | | 4/1949 | Labine | |
| 5,464,271 | A | | 11/1995 | McFarland | |
| 5,489,139 | A | | 2/1996 | McFarland | |
| 5,833,255 | A | | 11/1998 | Sarder et al. | |

(Continued)

FOREIGN PATENT DOCUMENTS

| DE | 4227226 A1 * | 2/1994 | ................ B62J 1/04 |
| DE | 20105369 U1 * | 6/2001 | ................ B62J 1/06 |

OTHER PUBLICATIONS

Byshulz, G.2 LT—Parallelogram Suspension Seatpost, https://byschulz.com/product/g-2-It-parallelogram-suspension-seatpost/?lang=en, accessed May 17, 2023.

(Continued)

*Primary Examiner* — Melody M Burch
(74) *Attorney, Agent, or Firm* — GRUMBLES LAW PLLC; Brittany Haanan (57) ABSTRACT

A bicycle suspension seatpost with a four-bar linkage design and a suspension spring element located within the seatpost tube is provided. The bicycle seatpost comprises a seatpost tube configured to be secured to a bicycle frame, a pair of substantially vertically stacked linkage bars rotatably connected to the seatpost tube, a rear linkage rotatably connected to the pair of substantially vertically stacked linkage bars, and a biasing member disposed within the protrusion to resist rotation of the pair of substantially vertically stacked linkage bars about one or more axes of rotation.

13 Claims, 5 Drawing Sheets

(56) References Cited

U.S. PATENT DOCUMENTS

| | | | |
|---|---|---|---|
| 6,032,934 A * | 3/2000 | Wu | B62J 1/06 |
| | | | 267/281 |
| 6,089,656 A | 7/2000 | Hals | |
| 6,270,065 B1 | 8/2001 | Hals | |
| 6,409,130 B1 | 6/2002 | Maret | |
| 8,888,117 B2 | 11/2014 | Barkley et al. | |
| 2006/0175792 A1 * | 8/2006 | Sicz | B62J 1/08 |
| | | | 280/200 |
| 2008/0018034 A1 * | 1/2008 | Huang | B62J 1/06 |
| | | | 267/195 |
| 2014/0110979 A1 | 4/2014 | Barkley et al. | |

OTHER PUBLICATIONS

Cane Creek, eeSILK Plus Carbon Seatpost, https://www.competitivecyclist.com/cane-creek-eesilk-plus-carbon-seatpost?CMP_ID=PD_GOc014BR&CSPID=0916&utm_source=Google&utm_medium=PSBR&%E2%80%A6, accessed May 17, 2023.

Cane Creek, eeSilk Suspension Seatpost, REI Co-op, https://www.rei.com/product/212243/cane-creek-eesilk-suspension . . . RfYvAJ73eATXuA1Kj192cHO4d5oAbv6xVTjTRoCGCgQAvD_BwE&gclsrc=aw.ds, accessed Jun. 1, 2023.

Cirrus Cycles, Kinekt LR Suspension Seapost, REI Co-op, https://www.rei.com/product/219782/cirrus-cycles-kinekt-lr-suspe . . . v_rGYWLkr2Kqgl1FRUIeXqThMxLOPI-w3BszmhoCaU0QAvD_BwE&gclsrc=aw.ds, accessed Jun. 1, 2023.

SR Suntour NA, NCX Seat Post, https://www.srsuntour.us/products/sp12-ncx-seatpost?utm_campaign=gs-2020-02-21&utm_source=google&utm_medium=smart_campaign&gad=1&gclid=CjwKCAjwg-GjBhBnEiwAMUvNW1Pq2uz1MiA_9GQjq96Ve50ET2HW1ne_g6qi2w5tklm2hnKgIM7W_BoCMFIQAvD_BwE, accessed May 17, 2023.

Cane Creek, Thudbuster ST Suspension Seatpost, https://www.rei.com/product/212245/cane-creek-thudbuster-st-suspension-seatpost, accessed Jun. 1, 2023.

Cirrus Cycles, Kinekt LR Suspension Seapost, REI Co-op, https://www.rei.com/product/219782/cirrus-cycles-kinekt-lr-suspe . . . v_rGYWLkr2Kqgl1FRUIeXqThMxLOPI-w3BszmhoCaU0QAvD_BwE&gclsrc=aw.ds, accessed Jun. 1, 2023.

* cited by examiner

SUSPENSION SEATPOST WITH INTERNAL SPRING

CROSS-REFERENCE TO RELATED APPLICATION

This application claims the benefit of U.S. Provisional Application No. 62/652,008, filed on Apr. 3, 2018.

BACKGROUND

The present invention generally relates to bicycle suspension seatposts and, more particularly, to a bicycle suspension seatpost with a four-bar linkage design and a biasing element located within the seatpost tube.

Unsuspended vehicles provide for uncomfortable rides. For example, a fully rigid bicycle transfers the roughness of the travelling surface to the rider via contact points between the rider and the bicycle. Vibrations and impacts are generally transferred to a rider's hands via a handlebar, feet via pedals, and posterior via a saddle. Vibrations and impacts can cause fatigue, soreness, and/or injury, ultimately leading to decreased performance ability of the rider.

Various constructions for suspension systems provide relief from such vibrations and impacts. Suspension forks and frames are often implemented in mountain bicycles. These suspension systems are too heavy and too inefficient to implement in road, gravel, or commuter bicycles, which are desired to be light and stiff. As such, most road, gravel, and commuter bicycles remain fully rigid thereby providing decreased ride quality and comfort.

SUMMARY

The present invention relates generally to bicycle suspension seatposts mountable between a bicycle frame and a saddle and, more particularly, to a bicycle suspension seatpost having a four-bar linkage design and an internal biasing element located within the seatpost. Aspects of the invention provide a suspension seatpost having a form similar to a typical rigid, i.e., non-suspended, bicycle seatpost, the similarity in form being provided by the biasing element disposed within the seatpost where it is hidden from view. The internal biasing element may be compressed or expanded by the rotation of the linkages to resist the movement of the linkages with respect to the seatpost.

In one embodiment, the bicycle seatpost comprises a seatpost tube configured to be secured to the frame of the bicycle, an upper linkage and a lower linkage each rotatably connected to the seatpost tube in a substantially vertically stacked orientation, a rear linkage rotatably connected to the upper linkage and the lower linkage and configured to connect to a saddle, and a biasing element disposed within the seatpost tube to resist rotation of the linkages about one or more axes of rotation.

BRIEF DESCRIPTION OF THE DRAWINGS

The present invention is described in the detailed description that follows with reference to the drawings by way of non-limiting examples of exemplary embodiments of the present invention.

DETAILED DESCRIPTION

According to certain embodiments, the bicycle suspension seatpost may comprise a four-bar linkage in which a seatpost tube is the first of the four bars of the four-bar linkage. The second and third linkages of the four-bar linkage may be linkage bars that are rotatably connected to the seatpost tube in a substantially vertically stacked orientation. In this orientation, one of these linkage bars may be referred to as the upper linkage and the other as the lower linkage. A fourth linkage, referred to herein as the rear linkage, may be rotatably connected to the upper and lower linkages, and may include means for affixing a bicycle saddle via one of any number of connectors well described in the prior art. A coil spring or other form of biasing element may be disposed within the seatpost tube and secured to the four-bar linkage so as to resist rotation of the linkages about one or more axes of rotation.

The upper and lower linkages may have substantially similar dimensions between their respective pivot axes, and the seatpost tube and rear linkage may have substantially similar dimensions between their respective pivot axes. This allows the forward/rearward tilt of the saddle to remain substantially constant throughout the suspended travel of the mechanism. Varying the length of the linkages slightly relative to one another allows the mechanism to be tuned to provide specific amounts of saddle tilt change through the travel. The suspension seatpost provides for comfortable damping of vibrations and/or impacts, resulting in improved performance and comfort of the rider.

Figure 1:
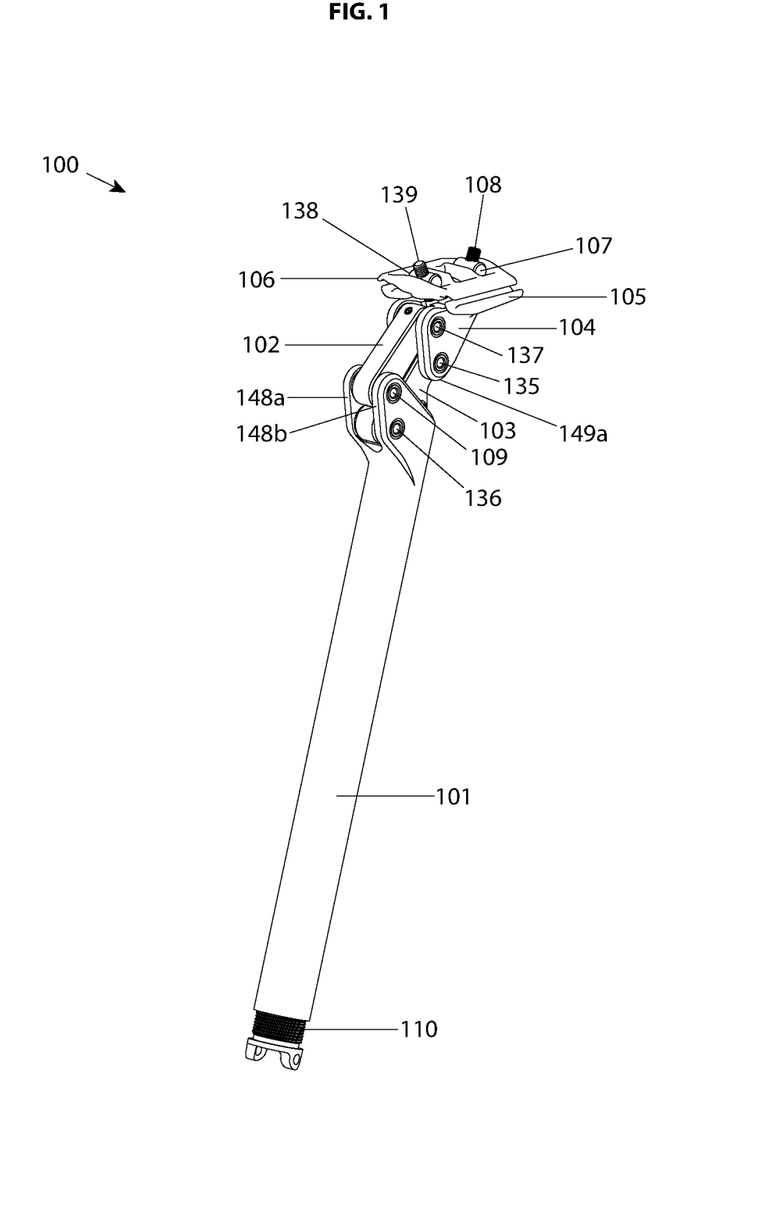
FIG. 1 shows a perspective view of an embodiment of the bicycle suspension seatpost in a neutral state.
Figure 2:
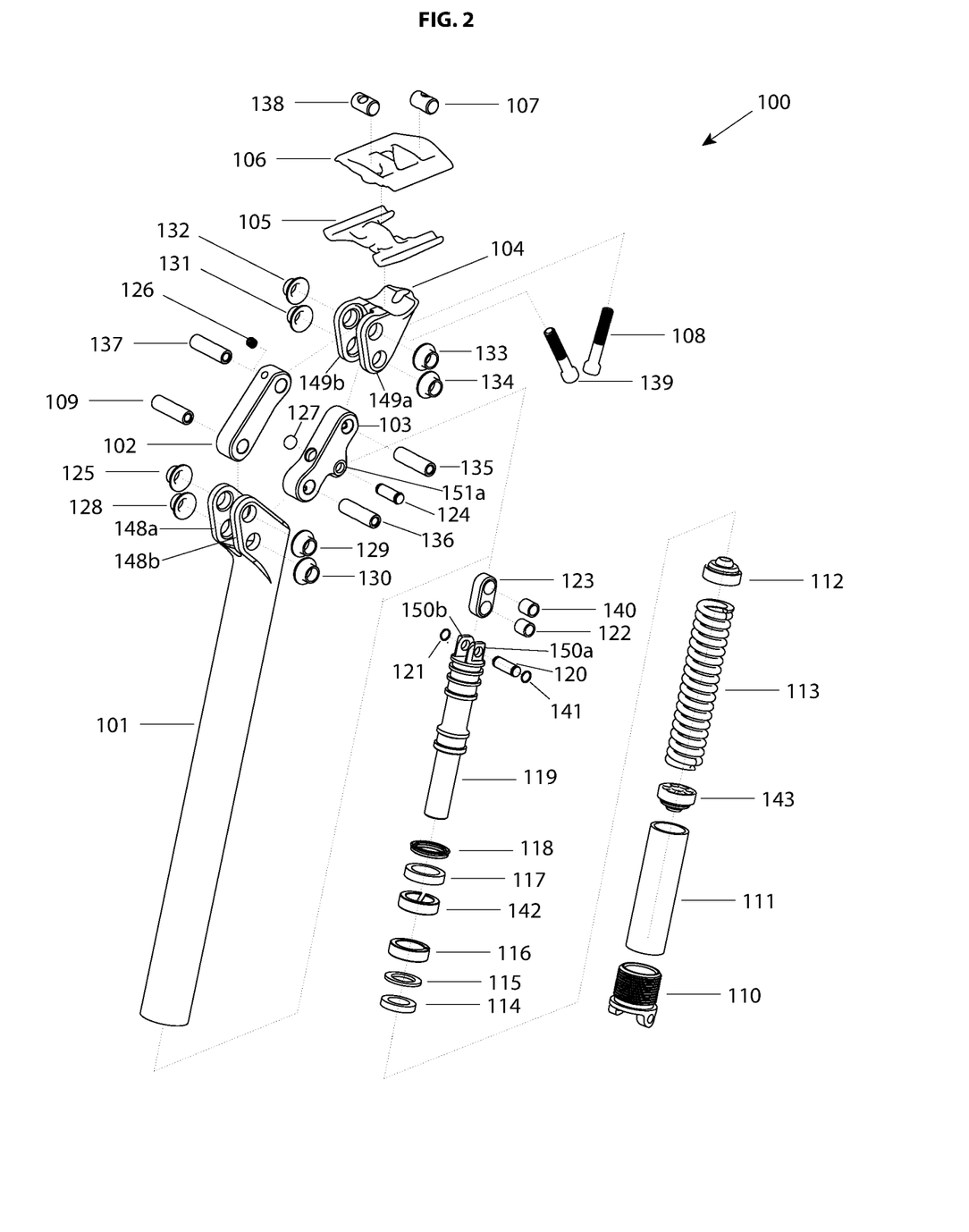
FIG. 2 shows an exploded perspective view of the seatpost of FIG. 1.

FIG. 1 shows a perspective view of one embodiment of the bicycle suspension seatpost. FIG. 2 shows an exploded perspective view of the bicycle suspension seatpost of FIG. 1. As shown in FIGS. 1 and 2, the four-bar linkage of the bicycle suspension seatpost 100 may comprise a static seatpost tube 101, an upper linkage 102, a lower linkage 103, and a rear linkage 104. The seatpost tube 101 may be provided with a pair of parallel projections 148a and 148b extending outward at the upper end thereof In an alternate embodiment, seatpost tube 101 may be provided with a single projection.

In similar fashion, the rear linkage 104 may be provided with a pair of parallel projections 149a and 149b extending outward at the lower end thereof. The upper linkage 102 may be rotatably secured to the seatpost tube 101 through the upper end of the pair of parallel projections 148a and 148b, and may be rotatably secured to the rear linkage 104 at the upper end of the pair of parallel projections 149a and 149b. In an alternate embodiment, rear linkage 104 may be provided with a single projection.

As shown in FIG. 2, the pair of parallel projections 148a and 148b of seatpost tube 101 is provided with holes to receive shafts 109 and 136 secured by set screws 145 and 146. The upper linkage 102 is rotatably secured to the upper end of the pair of parallel projections 148a and 148b of seatpost tube 101 by means of the shaft 109, set screw 145, and flange bushings 125 and 129. In embodiments with a seatpost tube having a single projection, the upper linkage 102 may be rotatably secured to the upper end of the projection on the seatpost tube by similar means. In such embodiments, the upper linkage 102 may be provided with a slot for mating with the upper end of the seatpost tube projection. The shaft 109 and flange bushings 125 and 129 are designed to be removable and replaceable by the user.

The pair of parallel projections 149a and 149b of rear linkage 104 may be provided with holes to receive shafts 135 and 137 secured by set screws 126 and 144. The upper linkage 102 may be similarly secured to the upper end of the pair of parallel projections 149a and 149b of rear linkage 104 by means of a shaft 137, set screw 126, and flange bushings 132 and 133. In embodiments with a rear linkage having a single projection, the upper linkage 102 may be rotatably secured to the upper end of the projection on the rear linkage in similar fashion. In such embodiments, the upper linkage 102 may be provided with a slot for mating with the upper end of the rear linkage projection. The shaft 137 and flange bushings 132 and 133 are designed to be removable and replaceable by the user.

The lower linkage 103 may be similarly rotatably secured to the lower end of the pair of parallel projections 148a and 148b of seatpost tube by means of a shaft 136, set screw 146, and flange bushings 128 and 130. In embodiments with a seatpost tube having a single projection, the lower linkage 103 may be rotatably secured to the lower end of the projection on the seatpost tube in similar fashion. In such embodiments, the lower linkage 105 may be provided with a slot for mating with the lower end of the seatpost tube projection. The shaft 136 and flange bushings 128 and 130 are designed to be removable and replaceable by the user.

The lower linkage 103 may be similarly secured to the lower end of the pair of parallel projections 149a and 149b of rear linkage 104 by means of a shaft 135, set screw 144, and flange bushings 131 and 134. In embodiments with a rear linkage having a single projection, the lower linkage 103 may be rotatably secured to the lower end of the projection on the rear linkage in similar fashion. In such embodiments, the lower linkage 103 may be provided with a slot for mating with the lower end of the rear linkage projection. The shaft 135 and flange bushings 131 and 134 are designed to be removable and replaceable by the user.

Figure 3:
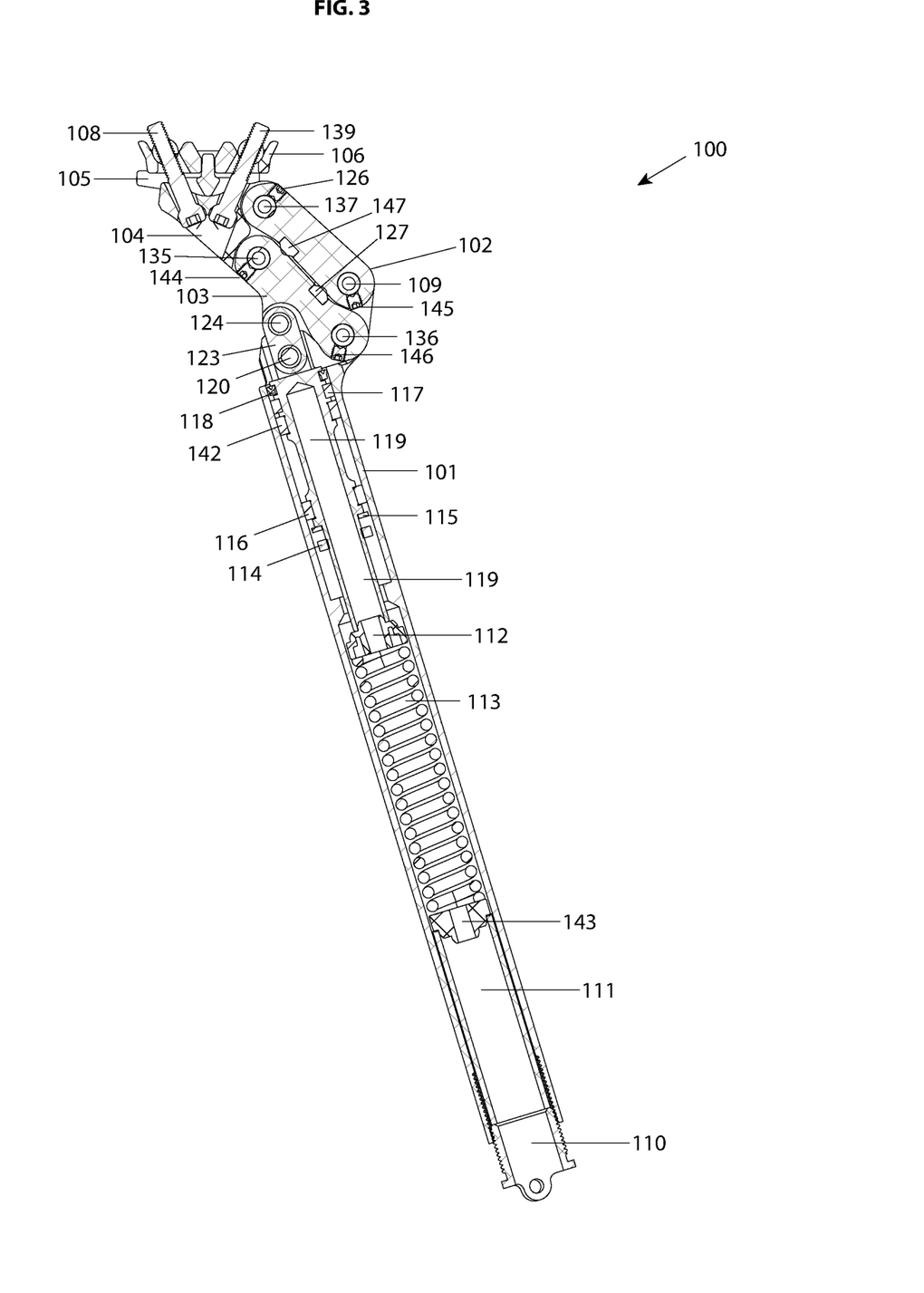
FIG. 3 shows a cross-sectional view of the seatpost of FIG. 1.

In certain embodiments, one or both of the upper linkage 102 and lower linkage 103 may be provided with one or more elastomeric bumpers to prevent direct contact between the upper linkage 102 and lower linkage 103. In the embodiment shown in FIGS. 2-4, the upper linkage 102 is provided with elastomeric bumper 147 disposed on the lower surface thereof, and lower bumper 103 is provided with elastomeric bumper 127 disposed on the upper surface thereof. As shown in FIG. 3 in which the bicycle suspension seatpost is in a neutral state, physical contact between upper linkage 102 and lower linkage 103 is prevented by the elastomeric bumpers 124 and 147 interposed between such linkages.

The seatpost tube 101 is configured to be secured to the frame of a bicycle via any of the common means currently established by the prior art. The seatpost tube 101 may be of various lengths, for example, from about 250 mm to about 500 mm. The rear linkage 104 is configured to connect to a standard bicycle saddle (not shown) via any of the common means currently established by the prior art.

In one embodiment, the bicycle suspension seatpost employs four main suspension pivots which connect the seatpost tube 101, upper linkage 102, lower linkage 103, and rear linkage 104, together forming a four-bar linkage. The axes of all four main suspension pivots are parallel to one another and are also parallel to the axis of the bicycle's rear wheel when the seatpost is installed with its left/right symmetry plane coincident with the left/right symmetry plane of the bicycle. The axes of the suspension pivots which connect the seatpost tube 101 to the upper linkage 102 and lower linkage 103 are oriented such that the upper pivot axis is located substantially above the lower pivot axis. In one embodiment, the lengths of the opposing linkages in the four-bar linkage are equal such that the four-bar linkage forms a parallelogram. This ensures that the pitch angle of the saddle remains constant throughout the suspension travel of the seatpost. Other embodiments of the invention may vary the lengths of the individual linkages to achieve specific relationships of saddle pitch versus suspension deflection.

A saddle may be connected to the rear linkage 104 using any of the common means currently established by the prior art. As shown in FIGS. 2-5, an upper saddle clamp 106 and lower saddle clamp 105 rest on top of the rear linkage 104. A front bolt 139 and a rear bolt 108 pass through the rear linkage 104, through the upper saddle clamp 106 and are captured by two cylindrical nuts 107 and 138 that rest in pockets at the front and rear of the upper surface of the upper saddle clamp 106. By tightening or loosening one bolt relative to the other, the pitch of the saddle may be adjusted, and the saddle may be clamped securely to the rear linkage 104. Other common embodiments of standard saddle clamping mechanisms may also be applied to connect the rear linkage 104 to a saddle. Examples of alternative embodiments include (but are not limited to) single-bolt side address clamps, and single-bolt or double-bolt bottom address clamps. Any of the saddle clamps described herein may be adapted to fit different saddle rail types, including but not limited to ovalized rails.

As noted above, FIG. 2 shows an exploded perspective view of the bicycle suspension seatpost of FIG. 1. In addition to the elements shown in FIG. 1, FIG. 2 also shows the biasing mechanism that is located within the seatpost tube 101 and connected to the lower linkage 103. The biasing mechanism may be comprised of a plunger 119 that may be provided with a pair of parallel projections 150a and 150b extending upward from the top end thereof. The pair of parallel projections 150a and 150b may be provided with holes to receive a shaft 120 for securing the plunger 119 to the four-bar linkage. When deployed, the plunger 119 slides along the long axis of the seatpost tube 101 in such a way that downward rotation of the upper linkage 102 and the lower linkage 103 causes the plunger 119 to move downward within the seatpost tube 101.

In certain embodiments, the connection between the four-bar linkage and the plunger 119 may be achieved by means of an additional plunger linkage, which may be attached at its upper end to either the lower linkage 103, the upper linkage 102, the rear linkage 104, or either of two shafts 135 or 137. In the embodiment shown in FIG. 2, the plunger linkage 123 may be rotatably attached to the plunger 119 by means of a shaft 120 that is positioned within a sleeve bushing 122 that itself is positioned within the lower end of the plunger linkage 123. The shaft 120 may be secured within the lower end of the plunger linkage 123 by means of a pair of snap rings 121 and 141. As shown in FIG. 2, the plunger linkage 123 may be rotatably attached to the lower linkage 103 at pivot 151a by means of a shaft 124 that is positioned within a sleeve bushing 140 that is itself positioned within the upper end of the plunger linkage 123.

In another embodiment, the connection between the four-bar linkage and the plunger 119 may include sliding cam surfaces, where a cam surface on lower linkage 103, upper linkage 102, rear linkage 104, or either of the two shafts 135 or 137 slides against a cam surface on the top of the plunger 119, pushing the plunger 119 downward as the linkage rotates. In another embodiment, the cam surface on the lower linkage 103, upper linkage 102, rear linkage 104, or either of the two shafts 135 or 137 connecting the upper, rear, and lower linkages, or the cam surface on the top of the plunger 119 may be replaced with a cam-following roller to achieve similar results while reducing the amount of sliding friction compared with the sliding cam surfaces.

In certain embodiments, the plunger 119 may be provided with one or more seals, oil retaining rings, wear rings and o-rings on the outside surface of the plunger body which press against the interior wall of the seatpost tube. Seals serve to prevent water, dirt, and other contaminants from entering the seatpost tube. Oil retaining rings serve to retain lubricating oil which helps reduce friction as the seals and wear rings move against the inside wall of the seatpost tube. Wear rings bear against the inside wall of the seatpost tube, resisting any component of load that is perpendicular the seatpost tube axis. O-rings act to limit the downward movement of the plunger 119. In the embodiment shown in FIG. 2, the plunger 119 is provided with seal 118, oil retaining ring 117, wear rings 116 and 142, washer 115, and O-ring 114. It is understood that various combinations of such seals, rings, and washers may be provided.

Figure 4:
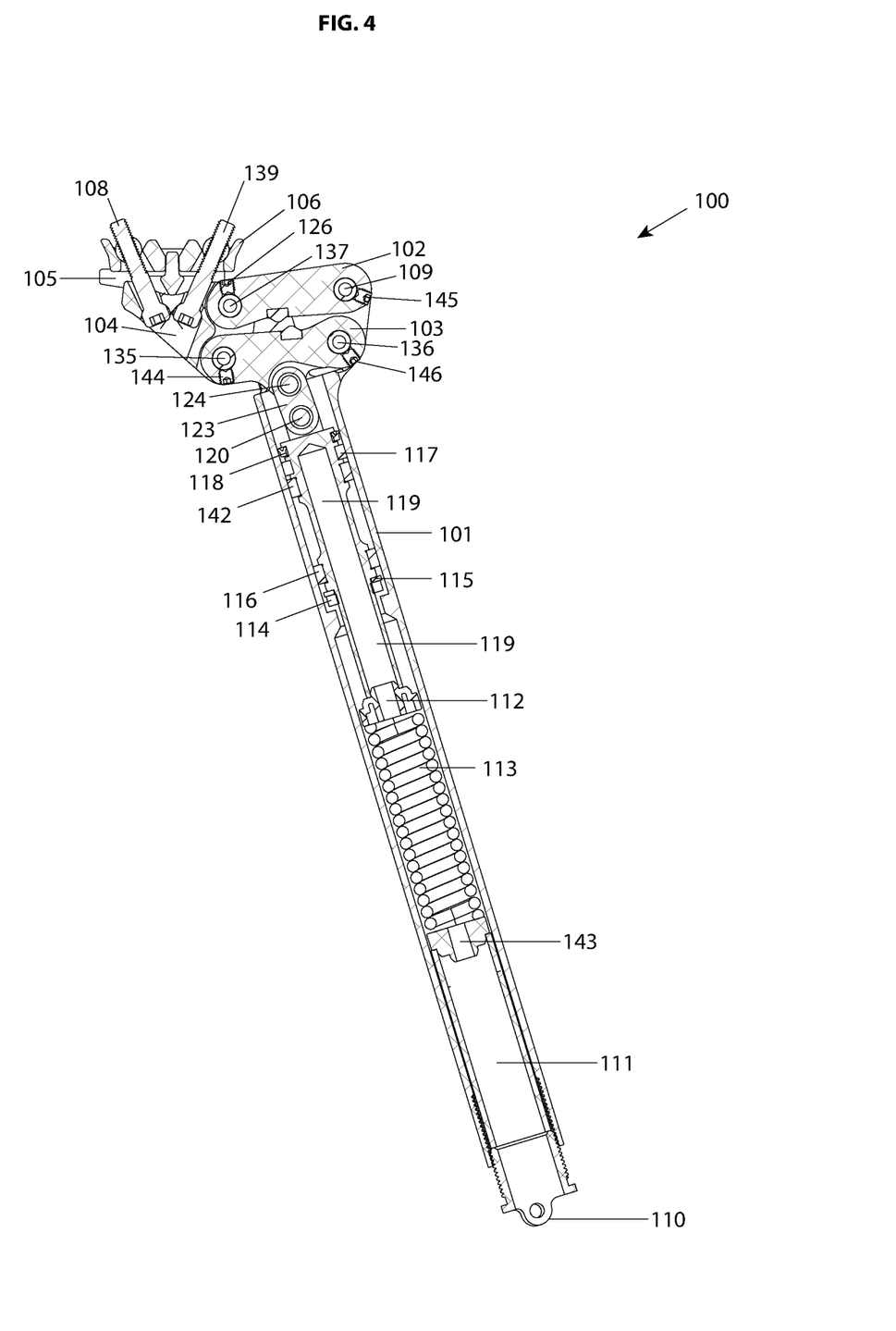
FIG. 4 shows a cross-sectional view of the seatpost of FIG. 1 in a compressed state.
Figure 5:
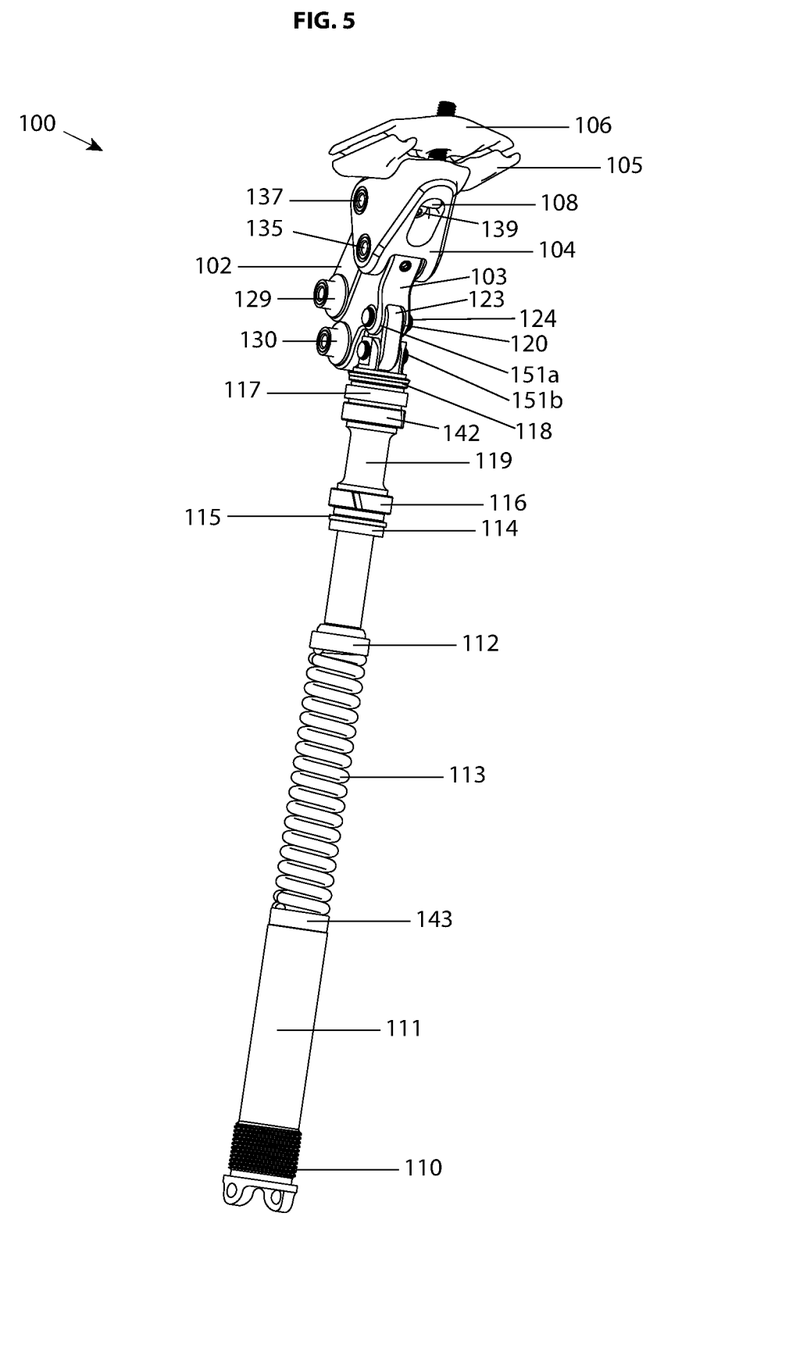
FIG. 5 shows a perspective view of the seatpost of FIG. 1 in a neutral state without the seatpost tube to show the arrangement of internal components.

In the embodiment shown in FIGS. 3-5, the plunger 119 is positioned above a coil spring 113 within the seatpost tube 101. The coil spring may be provided with rigid spring endcaps 112 and 143 at either end. The bottom end of the coil spring 113 is rigidly supported axially relative to the seatpost tube 101. When the plunger 119 moves downward along the axis of the seatpost tube 101, it compresses the coil spring 113, and the force provided by the coil spring 113 in the upward direction increases. The coil spring 113 is secured in such a way as to allow the user to easily remove and replace it from the seatpost tube 101, either for servicing or for replacement. The user may also adjust the suspension behavior of the seatpost by replacing a specific biasing element with another biasing element with different characteristics.

In certain embodiments, the coil spring 113 may be replaced with another biasing element including, but not limited to, an elastomeric material or other resilient compressible material, a compressible gas, a pneumatic spring, or leaf springs of metal, carbon fiber, fiberglass, or other construction. Different forms or combinations of biasing elements may also be employed to change the effective force provided by the biasing element throughout the travel of the plunger.

In certain embodiments, the bicycle suspension seatpost may also include damping elements within or alongside the biasing mechanism to control the compression and extension of the biasing mechanism. Common implementations of such damping elements include oil damping circuits or pneumatic damping circuits. The damping provided by the damping element may be rate-dependent (i.e., the damping may be dependent on the rate of change of the position of the plunger), constant, or it may vary depending on force or other parameters. It may also act in both extension and compression.

In the embodiment shown in FIGS. 2-5, the bottom of the coil spring 113 may be supported by a spacer tube 111, which in turn may rest on a preload plug 110, which connects to the bottom of the seatpost tube 101. The interface between the preload plug 110 and the seatpost tube 101 may be accomplished in any variety of ways which allow the axial position to be adjusted, with or without tools, spacers, or other parts. In one embodiment, the preload plug may be connected to the bottom of the seatpost tube 101 via a threaded interface which allows its axial position relative to the seatpost tube 101 to be adjusted by the user. Varying the axial position of the preload plug 110 relative to the seatpost tube 101 also allows the user to adjust the initial compression, or "preload," that is applied to the biasing mechanism when the upper and lower linkages are in their uppermost extended position. By adjusting the initial compression, the force provided by the biasing mechanism can be changed at all positions throughout the mechanism's range of travel. In this manner, the user can adjust the stiffness of the biasing mechanism to match their weight and preferred feel.

In certain embodiments, the bicycle suspension seatpost is provided with a locking mechanism to disable its suspension capabilities. Such locking mechanisms preferably provide for engagement and disengagement, and include, but are not limited to, locking pins, detents, or other such mechanisms known in the art.

The descriptions of the various embodiments of the present invention have been presented for purposes of illustration but are not intended to be exhaustive or limited to the embodiments disclosed. Modifications and variations will be apparent to those of ordinary skill in the art without departing from the scope and spirit of the described embodiments.

What is claimed is:

1. A bicycle suspension seatpost mountable between a bicycle frame and a bicycle saddle for securing the saddle to the bicycle, the bicycle suspension seatpost comprising:
   a seatpost tube having an upper end and one or more projections extending outward at the upper end, wherein the one or more seatpost tube projections have an upper end and a lower end;
   a pair of substantially vertically stacked linkage bars rotatably connected to the seatpost tube at the upper ends of the one or more seatpost tube projections, wherein
      a first of the pair of substantially vertically stacked linkage bars rotatably connects, at its first end, to the one or more seatpost tube projections at a first axis of rotation,
      a second of the pair of substantially vertically stacked linkage bars rotatably connects, at its first end, to the one or more seatpost tube projections at a second axis of rotation,
      the first axis of rotation is separate from the second axis of rotation, and
      the first and the second axes of rotation are forward of the seatpost tube centerline;
   a rear linkage having one or more projections extending outward, wherein
      the one or more rear linkage projections have an upper end and a lower end,
      the first of the pair of substantially vertically stacked linkage bars rotatably connects, at its second end, to the rear linkage projection at a third axis of rotation,
      the second of the pair of substantially vertically stacked linkage bars rotatably connects, at its second end, to the read linkage projection at a third axis of rotation, and
      the third axis of rotation is separate from the fourth axis of rotation; and a biasing mechanism disposed within the seatpost tube, configured to resist rotation of the pair of substantially vertically stacked linkage bars about one or more axes of rotation, wherein the first of the pair of substantially vertically stacked linkage bars is an upper linkage and the second of the pair of substantially vertically stacked linkage bars is a lower linkage, a plunger linkage engages the lower linkage of the substantially vertically stacked linkage bars, and the plunger linkage further engages the biasing mechanism within the seatpost tube.

2. The bicycle suspension seatpost of claim 1, wherein the biasing mechanism comprises a biasing element coupled with a plunger and configured to slide axially within the seatpost tube.

3. The bicycle suspension seatpost of claim 2, further comprising a spacer disposed within the seatpost tube and supporting the bottom of the biasing element.

4. The bicycle suspension seatpost of claim 3, further comprising a preload adjustment knob disposed at the bottom of the seatpost tube and supporting the bottom of the spacer.

5. The bicycle suspension seatpost of claim 1, wherein the biasing mechanism comprises a spring coupled with a plunger and configured to slide axially within the seatpost tube.

6. The bicycle suspension seatpost of claim 1, wherein the plunger linkage has upper and lower ends and each end has a connection point, the upper connection point of the plunger linkage connects to a central portion of the lower linkage, and the lower connection point of the plunger linkage connects to the biasing mechanism.

7. The bicycle suspension seatpost of claim 6, wherein the biasing mechanism includes a spring and a plunger, the plunger has a pair of parallel projections extending upward from a top end, and each projection of the plunger has a hole to receive a shaft for securing the plunger linkage to the plunger.

8. The bicycle suspension seatpost of claim 7, wherein the plunger is positioned above the spring.

9. The bicycle suspension seatpost of claim 1, wherein the lower linkage has a protrusion with a central pivot, the lower linkage has upper and lower pivot points on its corresponding ends that lie along an axis line, the central pivot of the lower linkage is offset relative to the axis line of the upper and lower pivot points.

10. The bicycle suspension seatpost of claim 1, further comprising one or more elastomeric bumpers, wherein the one or more elastomeric bumpers are disposed on the upper linkage, the lower linkage, or both.

11. The bicycle suspension seatpost of claim 10, wherein the one or more elastomeric bumpers are interposed between the upper and lower linkages, and the one or more elastomeric bumpers are positioned such that they prevent physical contact between the upper linkage and the lower linkage.

12. The bicycle suspension seatpost of claim 11, wherein the one or more elastomeric bumpers are comprised of a first elastomeric bumper and a second elastomeric bumper, the first elastomeric bumper is disposed on a lower surface of the upper linkage, and the second elastomeric bumper is disposed on an upper surface of the lower linkage.

13. A bicycle suspension seatpost mountable between a bicycle frame and a bicycle saddle for securing the saddle to the bicycle, the bicycle suspension seatpost comprising:

a seatpost tube having an upper end and at least one projection extending outward at the upper end;

a pair of adjacently stacked linkages rotatably connected to the at least one projection, wherein the linkages are comprised of an upper linkage and a lower linkage, the upper linkage rotatably connects to the at least one projection at a first axis of rotation, the lower linkage rotatably connects to the at least one projection at a second axis of rotation, the first axis of rotation is separate from the second axis of rotation, and the first and the second axes of rotation are forward of the seatpost tube centerline;

a rear linkage having at least one projection, wherein the rear linkage is rotatably connected to the pair of adjacently stacked linkages at the at least one rear linkage projection;

a biasing mechanism disposed within the seatpost tube configured to resist rotation of the pair of adjacently stacked linkages about one or more axes of rotation; and a plunger linkage engaged with the lower linkage, wherein the plunger linkage has upper and lower ends and at least the lower end has an opening, the biasing mechanism is a coil spring, the plunger linkage connects to a plunger, wherein the plunger is located above the coil spring, the plunger has a pair of parallel projections extending upward from a top end, and each projection of the plunger has a hole to receive a shaft for securing the plunger linkage to the plunger.

\* \* \* \* \*